United States Patent Office 3,567,722
Patented Mar. 2, 1971

3,567,722
2-MORPHOLINO-3-SPIRO CYCLOALKENYL-5-HY-
DROXY-2,3 DIHYDRO BENZOFURANS
Kurt Ley, Helmut Walz, and Wolfgang Redetzky, Leverkusen, and Helmut Freytag, Cologne-Stammheim, Germany, assignors to Farbenfabriken Bayer Aktiengesellschaft, Leverkusen, Germany
No Drawing. Continuation of application Ser. No. 634,783, Jan. 26, 1967, which is a division of application Ser. No. 550,899, May 18, 1966, now Patent No. 3,344,109, which in turn is a continuation-in-part of applications Ser. No. 267,930, Mar. 26, 1963, and Ser. No. 398,421, Sept. 22, 1964. This application Sept. 8, 1969, Ser. No. 856,924
Int. Cl. C07d 87/32
U.S. Cl. 260—247.7        3 Claims

ABSTRACT OF THE DISCLOSURE

Compounds of the general formula

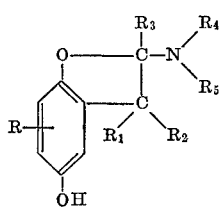

wherein the several R substituents are H or organic substituents, wherein $R_1$ and $R_2$ can form part of a carbocyclic ring, and $R_4$ and $R_5$ can be bonded to one another through a carbon or hetero atom bridge. The compounds are useful as age resister additives for rubber compositions.

---

This invention relates to novel compounds, their production and their use as age resisters in natural rubber and synthetic rubber-like polymers. This application is a streamlined continuation of Ser. No. 634,783, filed Jan. 26, 1967, now abandoned, which in turn is a division of Ser. No. 550,899, filed May 18, 1966, now U.S. Pat. 3,344,109, which in turn is a continuation in part of Ser. No. 267,930, filed Mar. 26, 1963, now abandoned, and Ser. No. 398,421, filed Sept. 22, 1964, now abandoned.

It is known that substituted phenols such as 2,6-ditertiary butyl-4 methylphenol or diphenols such as 2,2'-methylene-di-(4-methyl-6-tertiary butyl-phenol) may be used as age resisters for pale and colored rubber articles which should not become discolored or only to a slight extent in daylight. The compounds so prepared have the disadvantage that they have either an inadequate protective effect or are not satisfactory in preventing discoloration on exposure to natural light and are to a certain extent not readily available commercially. Furthermore, 2,5-alkylated hydroquinones impart only a very slight protection to rubber against oxidation.

It has now been found that compounds of the general formula (Formula I):

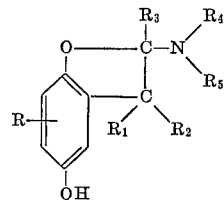

wherein each of $R_1$, $R_2$ and $R_3$ is hydrogen, an alkyl radical or a cycloalkyl radical, and wherein $R_1$ and $R_2$ can be bonded directly to each other, and wherein $R_1$ and $R_2$ together with the carbon atom to which they are attached can represent a 6-membered carbocyclic ring, which can optionally be substituted by alkyl radicals, and wherein R represents hydrogen or one or two alkyl radicals or an optionally substituted phenyl radical and wherein $R_4$ and $R_5$ represents alkyl or cycloalkyl radicals, and wherein $R_4$ and $R_5$ can also be bonded directly to one another, through a carbon or hetero atom bridge, can be used as age resisters for natural and synthetic rubber. The alkyl radicals advantageously represent lower alkyl radicals, which can contain up to 6 carbon atoms.

If R represents a phenyl radical then it can contain, for example, as substituents, alkyl radicals, preferably lower alkyl radicals such as methyl or ethyl, or alkoxy groups such as methoxy or ethoxy.

The compounds used according to the invention may be obtained by adding on enamines to p-benzoquinones with free 5,6-positions.

The enamines used for the reaction correspond for examples to the following general formula (Formula II):

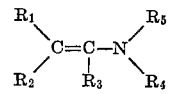

in which radicals $R_1$ to $R_5$ have the meaning indicated above in Formula I. Examples of such compounds are isobutenylpyrrolidine, -piperidine, -morpholine, -diethylamine, -dimethylamine or the corresponding cyclohexenyl compounds. The alkyl radicals are preferably lower alkyl radicals containing up to 6 C-atoms. Specific enamines include N-(isobutenyl) morpholine, N-(isobutenyl) piperidine, N-(α-methylenecyclohex-3-enyl) morpholine, N-(α-methylene-cyclohexyl) morpholine or N-(α-methylene-methylcyclohex-3-enyl) morpholine.

Apart from p-benzoquinone itself, quinones which are substituted in the 2- and/or 3-position, e.g. by lower alkyl radicals such as methyl or ethyl radicals may also be used for the reaction. Examples of the p-quinones are the following compounds: p-benzoquinone, 2-phenyl-p-benzoquinone, 2-(o-tolyl)-p-benzoquinone, 2-(p-tolyl)-p-benzoquinone, 2-(o-ethylphenyl)-p-benzoquinone, 2-(p-ethylphenyl)-p-benzoquinone, 2-(o-chlorophenyl) - p - benzoquinone, 2-(p-chlorophenyl)-p-benzoquinone, 2-(o-methoxyphenyl) - p - benzoquinone, 2-(p-methoxyphenyl)-p-benzoquinone, 2-(o-ethoxyphenyl)-p-benzoquinone or 2-(o-propoxyphenyl)-p-benzoquinone.

The production of the compounds used according to the invention is advantageously carried out in an inert solvent, such as benzene, toluene, methanol, ethanol or benzine. The quinone is generally provided initially and the enamine is introduced in small charges at temperatures between 0 and 80° C., advantageously at room temperature. It may be expedient for the reaction mixture thereafter to be heated for some time to its boiling point.

The di-hydroxycyclobutanes separate out on cooling.

The compounds used according to the invention are suitable as age resisters both for natural rubber and for synthetic rubber such as butadiene-styrene copolymers and butadiene-acrylonitrile copolymers. The compounds may be used both for protecting crude rubbers and mixtures thereof and the vulcanizates. In each case, between 0.1 and 5% by weight, preferably between 0.25 and 2% by weight calculated on the elastomers is added in the usual manner, e.g. by mixing on a roller or on an internal mixer.

Oxidation processes which lead to softening (degradation) or hardening (cyclization), depending on the type of elastomer used, are effectively prevented or greatly retarded by these additives, and no discolorations occur on exposure to light such as is characteristic for the age resisters of the secondary aromatic amine type (e.g. phenyl-β-naphthylamine) which have been used for a long time.

EXAMPLE 1

The following mixture was prepared on a roller:

| | Parts by weight |
|---|---|
| Pale crepe | 100.0 |
| Zinc oxide | 10.0 |
| Stearic acid | 1.0 |
| Titanium dioxide | 10.0 |
| Blanc fixe | 60.0 |
| Tetramethylthiuramic disulphide | 0.5 |
| Sulphur | 2.0 |
| Age resister as given in Table 1. | |

The substance is then vulcanized in a press for 17 minutes at 2 atmospheres above atmospheric pressure (133° C.). The vulcanizate so obtained has the following mechanical properties:

TABLE 1

[(a) With 1% by weight of 2,2'-methylene-di-(4-methyl-6-tertiary butyl-phenol) (for comparison)]

| | Strength (kg./cm.²) | Elongation (percent) | Load at 450% elongation (kg./cm.²) | Elasticity, 20° C./75° C. (percent) | | Shore hardness A |
|---|---|---|---|---|---|---|
| Before aging | 205 | 690 | 67 | 68 | 76 | 48 |
| Aging in an oxygen bomb (according to Bierer-Davis) 21 atmospheres above atmospheric pressure of oxygen at 70° C.: | | | | | | |
| After 6 days | 175 | 590 | 84 | 71 | 74 | 52 |
| After 11 days | 155 | 575 | 81 | 65 | 73 | 50 |
| After 16 days | 135 | 560 | 75 | 60 | 67 | 48 |

Note.—Color of the vulcanizates: Before illumination, white; after 2 months' weathering in the open air, pale pink. Formation of elephant skin: After 2 months' weathering in the open air, none.

(b) With 1% by weight of 2,6-di-tertiary butyl-4-methylphenol (for comparison)

| | Strength (kg./cm.²) | Elongation (percent) | Load at 450% elongation (kg./cm.²) | Elasticity, 20° C./75° C. (percent) | | Shore hardness A |
|---|---|---|---|---|---|---|
| Before aging | 190 | 670 | 69 | 70 | 74 | 48 |
| Aging in an oxygen bomb (according to Bierer-Davis) 21 atmospheres above atmospheric pressure of oxygen at 70° C.: | | | | | | |
| After 6 days | 135 | 555 | 83 | 66 | 73 | 49 |
| After 11 days | 120 | 585 | 63 | 57 | 67 | 45 |
| After 16 days | 75 | 560 | 47 | 46 | 54 | 42 |

Note.—Color of the vulcanizates: Before illumination, white; After 2 months' weathering in the open air, white. Formation of elephant skin: After 2 months' weathering in the open air, none.

(h) With 1% by weight of the compound.

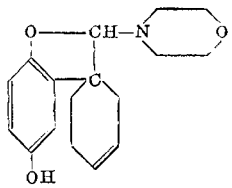

| | Strength (kg./cm.²) | Elongation (percent) | Load at 450% elongation (kg./cm.²) | Elasticity, 20° C./75° C. (percent) | | Shore hardness A |
|---|---|---|---|---|---|---|
| Before aging | 195 | 665 | 72 | 68 | 74 | 50 |
| Aging in an oxygen bomb (according to Bierer-Davis) 21 atmospheres above atmospheric pressure of oxygen at 70° C.: | | | | | | |
| After 6 days | 180 | 595 | 89 | 65 | 68 | 52 |
| After 11 days | 150 | 570 | 85 | 63 | 68 | 50 |
| After 16 days | 135 | 550 | 82 | 54 | 65 | 47 |

Note.—Color of the vulcanizates: Before exposure to light, white; After weathering in the open air for 2 months, white. Elephant skin formation: After weathering in the open air for 2 months, none.

(j) With 1% by weight of the compound.

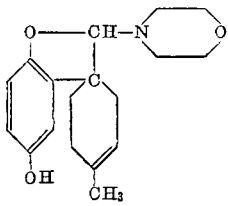

| | Strength (kg./cm.²) | Elongation (percent) | Load at 450% elongation (kg./cm.²) | Elasticity, 20° C./75° C. (percent) | | Shore hardness A |
|---|---|---|---|---|---|---|
| Before aging | 215 | 695 | 67 | 68 | 75 | 50 |
| Aging in an oxygen bomb (according to Bierer-Davis) 21 atmospheres above atmospheric pressure of oxygen at 70° C.: | | | | | | |
| After 6 days | 180 | 595 | 88 | 63 | 67 | 52 |
| After 11 days | 135 | 550 | 80 | 57 | 65 | 50 |
| After 16 days | 125 | 540 | 79 | 56 | 62 | 48 |

NOTE.—Color of the vulcanizates; Before exposure to light, white; After weathering in the open air for 2 months, white Elephant skin formation: After weathering in the open air for 2 months, none.

EXAMPLE 1b

With 1% by weight of the compound.

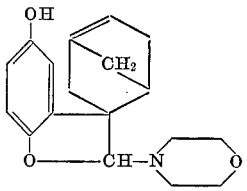

| | Strength (kg./cm.²) | Elongation (percent) | Load at 450% elongation (kg./cm.²) | Elasticity, 20° C./75° C. (percent) | | Shore hardness A |
|---|---|---|---|---|---|---|
| Prior to the aging | 225 | 680 | 78 | 70 | 73 | 52 |
| Aging in the oxygen bomb (according to Bierer-Davis) 21 atmospheres above atmospheric pressure of oxygen at 70° C.: | | | | | | |
| After 6 days | 185 | 580 | 93 | 70 | 68 | 52 |
| After 11 days | 145 | 540 | 90 | 60 | 67 | 51 |
| After 16 days | 140 | 545 | 83 | 57 | 63 | 49 |

NOTE.—Color of the vulcanizates: Before exposure to light, white; After 2 months weathering in the open air, white. Formation of elephant skin: After weathering in the open air for 2 months, none.

We claim:
1. A compound having the formula

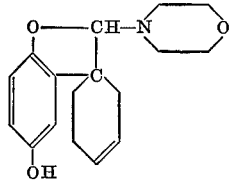

2. A compound having the formula

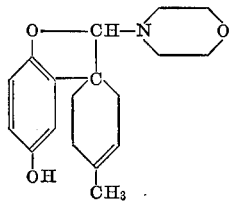

3. A compound having the formula

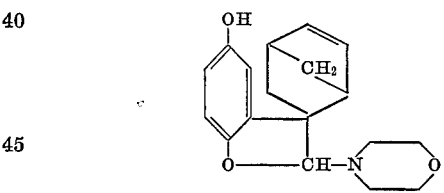

References Cited
UNITED STATES PATENTS
3,184,457   2/1963   Brannock et al. _____ 260—247.7

NICHOLAS S. RIZZO, Primary Examiner

J. TOVAR, Assistant Examiner

U.S. Cl. X.R.

260—294.7, 326.5, 346.2